US 6,643,657 B1

(12) United States Patent
Baird et al.

(10) Patent No.: US 6,643,657 B1
(45) Date of Patent: Nov. 4, 2003

(54) COMPUTER SYSTEM

(75) Inventors: Richard Baird, Markham (CA); Alan Ogilvie, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 08/851,153

(22) Filed: May 5, 1997

(30) Foreign Application Priority Data

Aug. 8, 1996 (GB) ............................................. 9616649

(51) Int. Cl.[7] ............................................. G06F 12/00
(52) U.S. Cl. ........................ 707/100; 707/10; 707/102; 707/9
(58) Field of Search .... 707/1–206; 395/200.31–200.59, 395/183.14, 683–712; 345/335–501; 709/218–226, 203–204; 84/622; 379/93.12

(56) References Cited

U.S. PATENT DOCUMENTS

| | | | |
|---|---|---|---|
| 5,347,632 A | | 9/1994 | Filepp et al. ............... 395/200 |
| 5,729,594 A | * | 3/1998 | Klingman ................ 379/93.12 |
| 5,734,119 A | * | 3/1998 | France et al. ................ 84/622 |
| 5,736,984 A | * | 4/1998 | Jellinek et al. ............. 345/335 |
| 5,745,889 A | * | 4/1998 | Burrows ..................... 707/102 |
| 5,745,894 A | * | 4/1998 | Burrows ........................ 707/3 |
| 5,784,553 A | * | 7/1998 | Kolawa et al. ......... 395/183.14 |
| 5,787,280 A | * | 7/1998 | Joseph et al. ............... 707/203 |
| 5,787,470 A | * | 7/1998 | DeSimone et al. ......... 709/218 |
| 5,796,952 A | * | 8/1998 | Davis et al. ........... 395/200.54 |
| 5,805,829 A | * | 9/1998 | Cohen et al. .......... 395/200.32 |
| 5,809,145 A | * | 9/1998 | Slik et al. ..................... 707/10 |
| 5,809,247 A | * | 9/1998 | Richardson et al. ... 395/200.48 |
| 5,809,502 A | * | 9/1998 | Burrows ..................... 707/103 |
| 5,852,820 A | * | 12/1998 | Burrows ..................... 707/103 |
| 5,862,386 A | * | 1/1999 | Joseph et al. ............... 395/712 |
| 5,864,863 A | * | 1/1999 | Burrows ..................... 707/103 |
| 5,872,965 A | * | 2/1999 | Petrick ....................... 345/501 |
| 5,889,951 A | * | 3/1999 | Lombardi ................... 709/219 |
| 5,890,170 A | * | 3/1999 | Sidana ........................ 707/501 |
| 6,560,616 B1 | * | 5/2003 | Garber ....................... 707/203 |
| 6,560,618 B1 | * | 5/2003 | Ims ............................ 707/204 |
| 6,571,282 B1 | * | 5/2003 | Bowman-Amuah .......... 707/10 |

OTHER PUBLICATIONS

Hassler et al., Controlling applets' behavior in a browser, Computer Security Applications Conference, 1998, Proceedings, 14th Annuanl, Dec. 7–11, 1998, pp. 120–125.*

(List continued on next page.)

Primary Examiner—David Jung
(74) Attorney, Agent, or Firm—Edward H. Duffield

(57) ABSTRACT

A computer workstation attached to a network such as the Internet runs browser software to access and retrieve pages of data from over the network, with the pages of data then being displayed at the computer workstation. A page of data can include a reference to code which the browser can also retrieve from over the network and then execute on the computer workstation. The reference to the code also has associated with it a reference to another file, again accessible over the network, which contains information pertaining to the code itself, such as the size of the code. The browser accesses the information in this file, prior to retrieving or executing the code. This information helps determine whether or not to retrieve the code.

31 Claims, 4 Drawing Sheets

OTHER PUBLICATIONS

Kindlund, Navigating the applet–browser divide, Software, IEEE, vol. 14, Issue 5, Sep./Oct. 1997, pp. 22–25.*

Ding et al., "Selective Java applet filtering on Internet", Systems, Man, and Cybernetics, 1999, IEEE SMC '99 Conference Proceedings, 1999, IEEE International Conference on, vol. 2, Oct. 12–15, 1999, pp. 110–114, vol. 2.* www.useit.com/alertbox/9507.html.* java.sun.com/sfaq/may95/security.html.* java.sun.com/sfaq/verifier.html.* java.sun.com/sfaq.*

Byte magazine, v21, n2, Feb. 1996, p. 87, McGraw–Hill, WebCompass advertisement.

Dialog record 01937821 of Windows Sources, v4, n6, p80(1), Jun. 1996, Hacker S, "Through the magnifying glass with WebAnalyzer".

Dialog record 01913893 of Newsbytes, pNEW03200031, Mar. 20, 1996, "10,000 'Screened' Shareware Titles from ZD–Net on Web".

Desktop Management Task Force, Software Standard Groups Definition, v2.0, Nov. 29, 1995.

Desktop Management Interface and Management Information Format Files (http://www.dmtf–org/team links/white_papers.html (Jul. 15, 1996).

* cited by examiner

COMPUTER SYSTEM

BACKGROUND OF THE INVENTION

The present invention relates to a computer system, and to a method of operating such a computer system attached to a network, such that the computer system can access data and code over the network.

In the past couple of years there has been an explosive growth in the Internet, and in particular of the WorldWide Web (WWW), which is one of the facilities provided on top of the Internet. The WWW comprises many pages or files of information, distributed across many different servers. Each page is identified by a Universal Resource Locator (URL). The URL denotes both the server machine, and the particular file or page on that machine. There may be many pages or URLs resident on a single server.

In order to use the WWW, a client runs a piece of software known as a Web browser, such as WebExplorer (provided as part of the Operating System/2 (OS/2) (™IBM Corporation), or the Navigator(™) program available from Netscape Communications Corporation. The client interacts with the browser to select a particular URL, which in turn causes the browser to send a request for that URL or page to the server identified in the URL. Typically the server responds to the request by retrieving the requested page, and transmitting the data for that page back to the requesting client (the client server interaction is performed in accordance with the hypertext transport protocol ("http")). This page is then displayed to the user on the client screen. The client may also cause the server to launch an application, for example to search for WWW pages relating to particular topics.

Most WWW pages are formatted in accordance with a language known as html (hypertext mark-up language). Thus a typical page includes text together with embedded formatting commands, referred to as tags, which can be used to control the font size, the font style (for example, whether italic or bold), how to lay-out the text, and so on. A Web browser parses the html script in order to display the text in accordance with the specified format. In addition, an html page can also contain a reference, in terms of another URL, to a piece of multimedia data, for example, an image, a video segment, or an audio file. A Web browser responds to such a reference by retrieving and displaying or playing the data. Alternatively, such multimedia data may form its own WWW page, without any surrounding html text.

Most WWW pages also contain one or more references to other WWW pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different colour). If a user selects the hyperlink, then the referenced page is retrieved and replaces the currently displayed page.

Further information about html and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

As so far described, and broadly speaking as currently implemented, the WWW suffers from the disadvantage that pages downloaded from a server to a client are essentially passive, in other words, they do not contain code which is executed at the client machine. One implication of this is that the server cannot offload onto the client any of the processing associated with the interaction between the client and the server. Thus if the client is completing a form with their telephone number for example, then any formal checks such as to the number of digits in the telephone number must be performed at the server. This results firstly in a heavier processing burden at the server, and secondly in time-consuming extra communications between the server and client should there be any mistakes to correct. Moreover, the inability of the server to download code for execution at the client is a significant limitation on the type of applications that can be created to exploit the WWW.

Recent developments, based particularly on the Java (™Sun Microsystems, Inc.) technology from Sun Microsystems Inc, have sought to overcome the above difficulties. The Java technology comprises primarily (i) a new programming language, somewhat similar to C and C++, and (ii) a virtual machine. Essentially, programs written in the Java programming language can be compiled into byte code form, and then interpreted at runtime on the Java virtual machine. The Java virtual machine converts the byte codes into instructions that can be executed by the underlying physical machine.

Programs written using Java can be downloaded over the WWW in the form of byte codes for execution on a Java virtual machine at the client. Such programs are known as "applets". The use of the Java technology for downloading code over the WWW has two major benefits. Firstly, an applet can be platform independent, if we assume that each client has a copy of the Java virtual machine (the virtual machine at the client's system is typically incorporated either into the operating system, or into the Web browser itself). In other words, there is no need for a server to have different versions of the code for downloading to clients according to their respective operating systems and machines. Therefore, only a single version of the relevant code needs to be written and maintained, which makes life much simpler for software developers. Secondly, because the applet executes on a virtual machine, rather than a physical machine, security is greatly improved. Thus, when downloading code over the network, there is always a risk that it will include some malicious code (accidentally or otherwise) that may damage data or programs stored at the client. The virtual machine however can monitor the operation of the applet, and so detect and prevent such malicious activity.

It will be noted that the concept of downloading software from a server to a client in the form of byte codes for execution on a virtual machine was also known independently of the Java technology, see for example U.S. Pat. No. 5,347,632.

In order to invoke a Java applet, a Web page of html text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters that are passed to the applet at run-time. (Note that the APPLET and PARAM tags are not formally incorporated into the html standard, but are nevertheless recognised by many Web browsers). Further information about the Java technology and applets can be found in "Teach Yourself Java in 21 Days" by Laura Lemay and Charles Perkins (Sams.net Publishing, Indianapolis, USA, 1996).

One of the difficulties with the above approach is that the amount of information that can be contained within the APPLET tag is limited. This can lead to problems if the browser has to decide whether or not to download a particular applet referenced within an html page. For example, the browser may not wish to download an applet which is particularly large (and hence slow to transport across the network), or which requires a more recent version of the Java virtual machine than the one currently installed at the client.

SUMMARY OF THE INVENTION

Accordingly, the invention provides a method of operating a computer attached to a network, having accessible at least one page of data that includes a reference to code that can be retrieved over the network for execution at said computer, characterised by the steps of:

locating, associated with said reference, an identifier to information about said code; and retrieving the information about the code.

Thus the computer can utilise the identifier to locate and retrieve information concerning the code. This information may then be used in order to determine whether or not to run said code. For example, the information preferably states the size of the code, and it may be decided that the code is too large to be downloaded within a reasonable time; another possibility is that the information specifies that execution of the code requires hardware support features, such as a video capture facility, which may not be installed at the client workstation. Such a determination may be explicitly surfaced to the user, or may be performed automatically based on predetermined criteria (or a combination of both automatic and user-prompted decision making could be adopted).

Other possible uses for the information about the code might include for audit purposes, perhaps in circumstances where there is some royalty payment attached to use of the code, or for simple informational purposes, such as providing access to a copyright notice and licensing terms, and so on. Another alternative is to use the information to assist in invoking the code itself. For example, if the code is encrypted, then the information may specify the algorithm needed to decrypt the code before it can be invoked.

In the preferred embodiment, once the information about the code has been retrieved and stored and/or processed as desired, the code itself is then retrieved over the network. Alternatively, the code might be retrieved prior to retrieval of the information about the code.

In the preferred embodiment, the at least one page of data is in html format, the reference comprises an APPLET tag, and the identifier comprises one or more attributes within said APPLET tag. Preferably said reference and said identifiers are in the form of Universal Resource Locators (URLs), with each reference and identifier being specified in two parts, the first specifying server and directory, the second the actual file name. In this preferred embodiment, the applet is downloaded in Java byte code form, for execution on a Java virtual machine at the client's workstation. This represents the typical situation where the computer is running a Web browser, and said at least one page of data, said code reference and said information are all accessible over the Internet.

It will be appreciated that since the specific APPLET tag is particularly associated with the Java language, it may be replaced in some future standard with a more generalised tag (ie one that is regarded as more language-neutral), although of course this would not affect the principle of the present invention. It will also be appreciated that in some circumstances, said at least one page of data may contain little or nothing apart from the reference to the code, and its associated identifier of the information (in other words, the primary or sole purpose of the page may be to access the code).

In a preferred embodiment, the information conforms to the Management Information Format (MIF). This is a well-known standard, and so is likely to be understood by the client trying to access the code. However, the information could be stored in any format which the browser can understand and access. The MIF information is copied over the network and then preferably loaded into the MIF database at the computer, where it can be interrogated by the browser (or simply stored for audit purposes). Alternatively, the MIF information may already be stored in a remote MIF database, so that information about the code can be retrieved by remotely interrogating said database over the network. This saves having to transmit the whole MIF file over the network.

Thus the invention provides a mechanism for making available information about code which can be accessed over the network. An alternative to the approach provided by the invention might be for example to have information relating to code present in an html page itself, for example as additional attributes in the <APPLET> tag. However, this would not only lead to the tags becoming potentially very large, but also each page which referenced a particular applet would then have to contain a copy of this information. This is not only more expensive in terms of storage requirements, but also extremely difficult to maintain from a practical point of view, since changes to the applet have to be reflected at multiple locations (indeed the owner of the code will generally be unaware of all the sites which reference that code). Another alternative might be for the information about code to be identified within the code itself, so that on execution the code initially brings up the relevant information. This strategy has the drawback that it requires the code to always be at least partly executed. Thus it can be seen that the approach adopted by the present invention represents the most powerful, flexible, and efficient way of making available information about code which can be accessed over the network.

The invention also provides a computer system, attachable to a network to access at least one page of data that includes a reference to code that can be retrieved over the network for execution at said computer, characterised by:

means for locating, associated with said reference, an identifier to information about said code; and means for retrieving the information about the code.

The invention further provides a computer program product for execution by a computer system attached to a network to access at least one page of data that includes a reference to code that can be retrieved over the network for execution at said computer system, said computer program product including:

means for locating, associated with said reference, an identifier to information about said code; and means for retrieving the information about the code.

The computer program product typically resides on a diskette or a CD-ROM, or alternatively may be stored on a tape or hard disk of a server machine for downloading across the network, and in use is copied into the working memory (typically RAM) of the computer system.

The invention further provides a Web browser for accessing at least one page of data on the World Wide Web that includes a reference to applet code that can be retrieved over the Internet for execution at said computer, characterised by:

means for locating, associated with said reference, an identifier to information about said applet code; and means for retrieving the information about the code.

BRIEF DESCRIPTION OF THE DRAWINGS

A preferred embodiment of the invention will now be described in detail by way of example only with reference to the following drawings.

DETAILED DESCRIPTION

Figure 1:
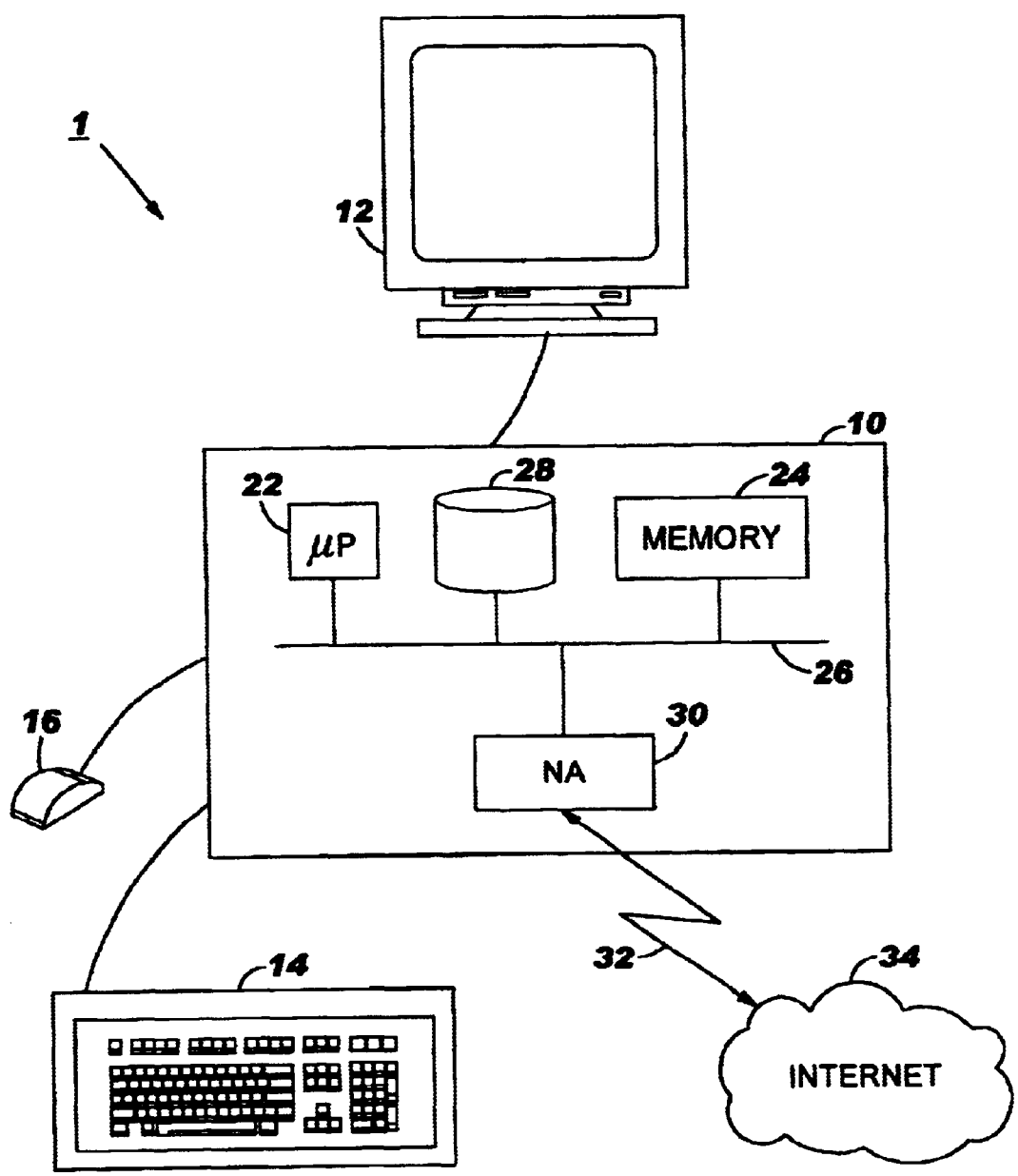
FIG. 1 is a simplified schematic diagram of a computer system.

FIG. 1 is a simplified schematic diagram of a computer system 1, including a system unit 10, a display screen 12, a keyboard 14 and a mouse 16. The system unit includes a microprocessor 22, semi-conductor memory (ROM/RAM) 24, a hard disk drive 28, and a bus over which data is transferred 26. A network adapter card 30 is provided, which, in conjunction with link 32, enables the computer workstation to exchange data with the Internet 34. The computer is essentially controlled by the microprocessor, based on software instructions loaded into ROM/RAM, typically from the hard disk drive, or from the network. The system of FIG. 1 may be any conventional workstation, such as a Personal Computer machine or a RISC System/6000 computer, both available from IBM Corporation. Such systems are very well-known in the art, and the skilled person is aware of great variety of possible system configurations: for example, the system may include a CD-ROM, have multiple network adapter cards, use a telephone modem instead of a network adapter card for the network connection, include audio systems, and so on. Such variations are not pertinent to an understanding of the present invention.

Figure 2:
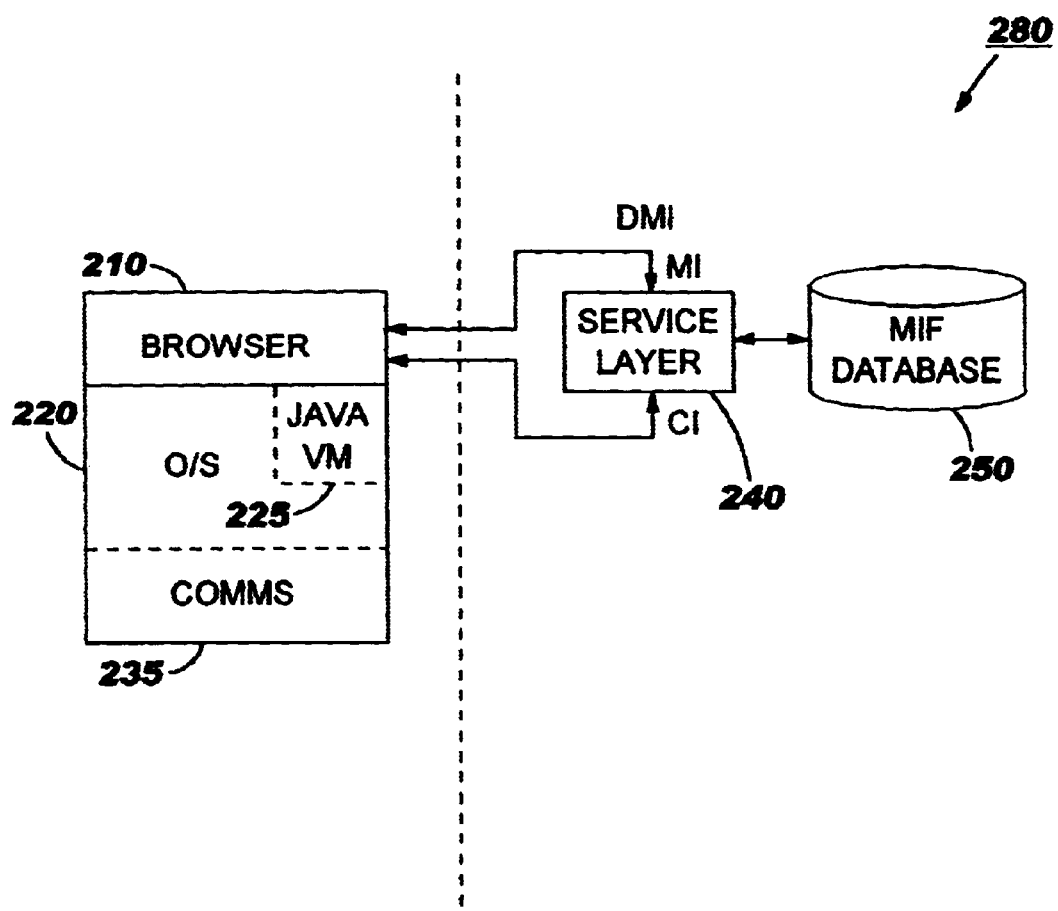
FIG. 2 is a simplified schematic diagram of the main software components on the computer system of FIG. 1.

FIG. 2 illustrates the software components running on system 1, including the operating system 220 and Web browser 210 (note that in some cases the browser may be incorporated into the operating system). As previously discussed, the browser is responsible for accessing material over the Internet, and displaying or otherwise processing the retrieved material as appropriate. One important feature of the browser is its ability to understand html commands. The operating system 220, such as the Advanced Interactive Executive Operating System (AIX) or OS/2, both are trademarks of, and are products available from IBM Corporation and are responsible for general system management of the workstation. Included within the operating system is communication software 235 which allows the workstation to interact with the Internet 34. As is well known in the art, such communications are based on the TCP/IP protocol. The operating system also includes a Java virtual machine 225, which can interpret Java byte codes in order to run Java applications. Note that in some cases the Java virtual machine may be provided as part of the browser. Also running in one embodiment on system 1 is Desktop Management Interface (DMI) software 280 (which also may be incorporated into the operating system 220). This will be described in more detail later.

System 1 and its software can be used to access and process WWW pages, including Java applets, in known fashion, using the http protocol. An example of the html text in a Web page which references a Java applet is as follows:

```
<APPLET CODEBASE =
    "http://ncc.hursley.ibm.com/javainfo/classes"
        CODE = "Map.class"
        WIDTH = 560
        HEIGHT = 560
    >
    <param name = IMAGE value = "graphics/cup-bun.jpg">
    <param name = MAP value = "java.map">
    <param name = TYPE value = "NCSA" >
</APPLET>
```

EXAMPLE 1

The browser interprets this html text as follows. In response to the <APPLET> and </APPLET> tags, the browser retrieves the code which is located in file "Map.class" at the server and directory specified by "http://ncc.hursley.ibm.com/javainfo/classes". (As is well-known in html, tags of the form "</xxx>" mark the end of information or data associated with the preceding corresponding <xxx> tag). This processing is essentially the same as accessing any WWW page from a URL. The browser then creates an applet context object. Associated with this are the values of HEIGHT and WIDTH (known as attributes), which define the amount of screen which the applet needs for execution, and also certain parameter values. These parameter values are listed in their own <PARAM> tags which specify the name and value of the tag, and can be retrieved into the applet itself by the use of the Java get parameter method. Thus for example TYPE is the name of a string variable in the Map.class applet, which is to be assigned the value "NCSA". Finally, the applet is executed by creating an applet object using the parameter data previously stored in the applet context object and then invoking the applet object using the Java init( ) instruction.

As mentioned previously, some difficulties can arise with this known approach, for example, the Java applet may require a more recent version of the Java virtual machine than is installed at the client. In this situation, if the client tries to download and run the applet, he or she may discover that operation of the applet is limited or impossible.

The present invention overcomes this problem by expanding the information presented to the browser relating to the applet. Thus, in accordance with the present invention, the html text of Example 1 would be modified as follows:

```
<APPLET CODEBASE =
    "http://ncc.hursley.ibm.com/javainfo/classes"
        CODE = "Map.class"
        MIFBASE=
    "http://ncc.hursley.ibm.com/javainfo/mifs"
        MIF="Map.mif"
        WIDTH = 560
        HEIGHT = 560
    >
    <param name = IMAGE value = "graphics/cup-bun.jpg">
    <param name = MAP value = "java.map">
    <param name = TYPE value = "NCSA" >
</APPLET>
```

EXAMPLE 2

It will be noted that Example 2 is the same as Example 1, except for the addition of two new attributes into the <APPLET> tag. The two attributes, MIFBASE and MIF, are analogous to the fields CODEBASE and CODE, in that they specify a URL comprising a server/directory and file respectively. However, whereas CODEBASE and CODE locate the actual code for the Java applet, MIFBASE and MIF locate a file containing information describing the applet. This file may reside on the same server and possibly in the same directory as the applet code itself, or may reside on a completely different server.

In the preferred embodiment, the file containing the information describing the applet is in a particular format known as the Management Information Format (MIF). This is a standard format developed by the DeskTop Management TaskForce (DMTF) industry consortium as part of the Desktop Management Interface (DMI). A short overview of DMTF and MIF is given in "The DMI Waiting Game" by Daniel Begun, in the Computer Shopper, n8, v15, p608, August 1995, and in "The End of the Balancing Act" by Barbara Gengler, in Internetwork, n8, v6, p47, August 1995. More information about MIF can be obtained from the DMTF at Hillsboro, Oregon, USA, or from their Web site, see in particular:

http://wwww.dmtf.org/general$_{13}$ info/factsheet.html, and
http://wwww.dmtf.org/techlinks/white_papers.html Briefly, a MIF file, which is in the form of plain text, comprises multiple groups. Certain standard groups have been defined, some of which are mandatory, but user-defined groups are also permitted. Within each group is a list of named attributes and their values. For example, one required group is "ComponentID", which has the attributes of Manufacturer, Product, Version, Serial Number, Installation (date and time), and Verify (whether the corresponding component actually exists and is working). Referring back to FIG. 2, a system supporting the DMI 280 has a MIF database 250, and a service layer 240 (these may be provided as part of the machine operating system). Manageable products (such as software applications) add or update their respective MIF files into or in the MIF database via a Component Interface (CI) of the service layer, whilst management applications can query the MIF database for information about the manageable applications via the Management Interface (MI) of the service layer. Samples of software MIF files plus further descriptive material can be obtained from the following Web site:

http://www-uk.hpl.hp.com/people/arp/dmtf/ver2.htm

Figure 3:
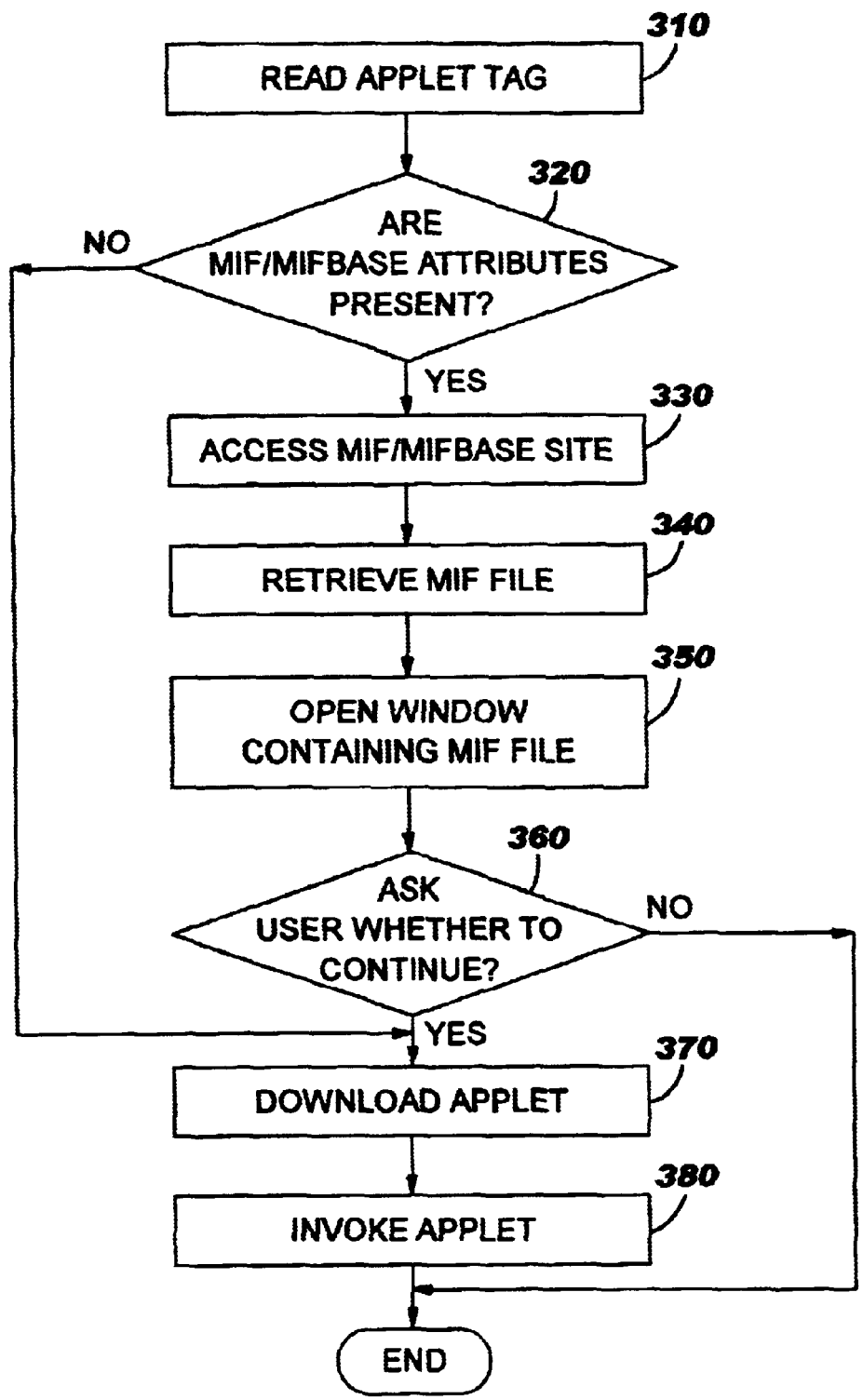
FIG. 3 is a flowchart illustrating processing according to a first embodiment of the invention.

The operation of the invention in one simple embodiment is shown schematically in FIG. 3. Initially, the browser software detects the presence of an <APPLET> tag (step 310), representing a reference to an applet to be downloaded and executed. Next the browser looks for the MIFBASE and MIF attributes associated with the referenced applet (step 320). Assuming that these are located, the browser then accesses and retrieves the specified MIF file (steps 330 and 340). The MIF file is then displayed to the user in a window (step 350), allowing the user to scroll through the MIF information, and the user is prompted with a dialog box asking whether or not to continue with the applet (step 360). Assuming that the MIF information is acceptable, the user can then download and invoke the applet (steps 370 and 380). However, if the MIF file reveals some problem, such as the applet being extremely large, or requiring a more recent version of the Java virtual machine than is installed at the client, then the user has the option of effectively aborting, thereby avoiding needlessly downloading or trying to run the applet.

Returning to step 320, if the MIF and MIFBASE attributes are not located, then an attempt is made to download and invoke the applet directly. Note that this is also the path taken by a browser which does not recognise the MIF and MIFBASE attributes, which would be the case with a prior art browser.

Figure 4:
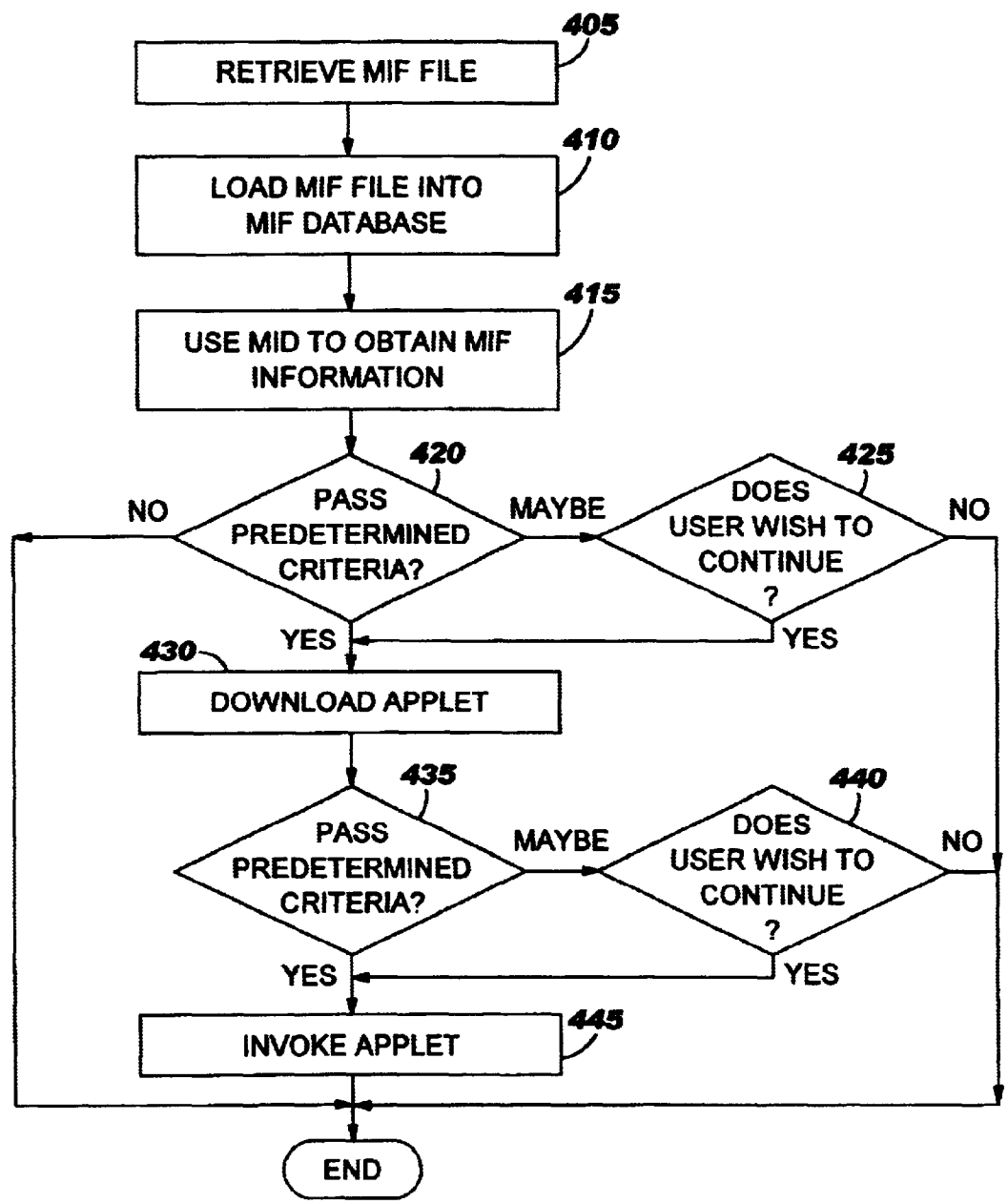
FIG. 4 is a flowchart illustrating processing according to a second embodiment of the invention.

Although the approach shown in FIG. 3 is relatively simple, it has the drawback that the user has to scan through the MIF file itself. A more complex processing approach is depicted in the embodiment of FIG. 4 (where we assume that the APPLET tag does contain the MIF/MIFBASE attributes). In this case, once the MIF information has been retrieved (step 405) from the server, it is loaded into the MIF database on the computer system (410) via the component interface (CI) of the service layer. Then, the management interface (MI) of the service layer is used to read out the MIF information from the MIF file (step 415). This interaction between the browser and the DMI is shown schematically in FIG. 2.

The browser tests the MIF information against predetermined criteria (step 420), such as to determine whether the version number of the target operating system (the Java virtual machine) is compatible with the version installed at the client (note that the browser can use the DMI to retrieve only selected information from the MIF file, ignoring attributes that are not needed for this testing). Unless the predetermined criteria are satisfied, processing of the applet terminates, without the applet ever having been downloaded. There may be some criteria which are always or conditionally surfaced to the user for a decision; for example, if the applet is larger than a certain size, the user may be asked to confirm whether. or not to continue (step 425), bearing in mind the length of time that may be required in order to download the applet. Assuming that the predetermined criteria are satisfied (with any necessary user confirmation), the applet is then downloaded (step 430). At this stage, further testing can be performed (step 435), typically for security purposes. For example, it can be verified that the applet is the correct size, and checks made that certain bytes specified in the MIF file properly match the content of the applet itself. Assuming that the predetermined criteria are once more satisfied (again subject to any necessary user confirmation at step 440), then the applet can now be invoked (step 445). Note that if the browser subsequently deletes the applet from the client system, then generally it should update the MIF database accordingly.

It will be appreciated that a great many variations are possible on the processing illustrated in FIGS. 3 and 4. For example, the MIF file may simply be loaded into the MIF database (step 410) for audit purposes, without performing any checking against predetermined criteria, or asking for user verification. Typically this would be done after the applet has been downloaded (step 430), with the browser then attempting to invoke the applet (step 445), irrespective of the content of the MIF file. Alternatively, some browsers may do the testing against predetermined criteria all automatically, without any of the testing being surfaced to the user. Another possibility is that the MIF file could contain information needed to execute the applet. For example, it has been contemplated that applets could be downloaded in encrypted form, to reduce the possibility of tampering, in which case the MIF could be used to specify the algorithm needed to decrypt the applet.

It is optional whether the MIF file is loaded into the MIF database, and if so, whether the browser obtains the MIF information directly from the MIF file itself, or by using the MIF database. Loading the MIF file into the MIF database may be useful for audit purposes, and also allows the browser to exploit the MI for retrieving MIF information from the MIF file. This avoids the need for the browser to have to parse the MIF file to retrieve the values of the various attributes. However, if a large number of applets are downloaded onto the client machine, and have only a transitory existence there before being executed and deleted, then in some circumstances it may be preferable to obtain the MIF information directly from the MIF file itself, rather than having the overhead associated with interacting with the DMI.

Note that some of the MIF attributes discussed, such as size of the code, and version number of the target operating system, are already present in standard DMI groups, whilst others, such as type of encryption used, would need to be placed in user-defined groups. There are no firm limits on the type of information that can be contained within a MIF, although clearly it is desirable to have a set of predefined attributes, preferably as part of the DMI standard, which most or all browsers can interpret. It is also desirable that if a browser does not recognise particular attributes in this set, then it is still able to invoke the associated applet where possible (this is somewhat analogous to the situation where a browser does not recognise a particular html tag, but can still generally display the information on a page, even if not in exactly the desired format).

In the above embodiments, the MIF file is downloaded in its entirety for analysis at the client. However, an alternative approach is to retrieve the information concerning the applet by interrogating the associated MIF file at a remote location. In this case it is most likely that the MIF file is incorporated into a MIF database, so that the attributes MIF and MIF-BASE would typically be used to locate the DMI through which access to the MIF database is provided. This arrangement is essentially the same as that shown in FIG. 2, except that now the DMI 280 is located on a different machine from operating system 220 and browser 210.

There are several possible mechanisms for obtaining this remote access to the DMI. For example, it is intended that DMI itself should directly support such remote access via the MI, although a full implementation of this is not directly available yet. In this case, the processing might be similar to that shown in FIG. 4, except that step 410 would be omitted, and the retrieval of the MIF information in step 415 would be performed via the remote access facility. Alternatively, the browser could use the well-known Simple Network Management Protocol (SNMP) to remotely interrogate the DMI, since DMI already supports this mechanism (the SNMP is described in "Internetworking with TCP/IP, Volume 2", by Douglas E Comer and David L Stevens, Prentice Hall, N.J., USA, 1991). Another possibility, which would avoid the need for the browser to include SNMP support, would be to have MIF and MIFBASE identify an intermediary program on the same machine as the MIF database. This intermediary would then receive requests in the http protocol from the browser for MIF information, with the requests specifying the particular desired attribute(s), submit these requests to the MI of the DMI, and then return the response to the browser, again in the http protocol.

The use of the MIF information directly at the remote location may be more efficient than initially copying the MIF information to the client, particularly if the browser is only interested in relatively few of the MIF attributes, since this avoids the need for the whole MIF file to be transmitted across the network. of course, with this approach the browser would have to separately record any desired audit information.

It will be appreciated that although in the preceding description the identifier for the applet information has been broken down into two components designated MIFBASE and MIF, the identifier could be represented in any suitable form and under any appropriate name. Further, the information about the code need not be a MIF file, but could be in a different format, such as the SNMP management information base (MIB) format, or any other suitable format defined or specified by the user. Also, whilst the identifier in Example 2 is located within the APPLET tag itself, one could introduce a separate tag located between the <APPLET> and </APPLET> tags (ie analogous to the <PARAM> tag) in which to store the identifier. of course, with all the above considerations, it is desirable to standardise on one particular option, which can then be supported by most or all browsers.

Further, whilst in the embodiments described above, the code for reviewing and interpreting the MIF file has been incorporated into the browser, this code could also form a separate program or object residing at the client, and known to the browser. Thus on retrieving the MIF file, the browser would pass the MIF file to the MIF interpreter program, which would then analyse the file in the desired manner. For example, the interpreter program could simply open a window to display the MIF file, and possibly also ask the user whether to continue, corresponding to steps 350 and 360 in FIG. 3; or simply add the MIF file to the local MIF database for auditing purposes, or test the MIF file against predetermined criteria. Where appropriate, the MIF interpreter program would return an appropriate response to the browser, indicating whether or not it should proceed with execution of the applet.

Alternatively, the MIF interpreter program could also be referenced by the Java virtual machine itself, which when invoked to run an applet, initially runs the MIF interpreter program, for example to record use of the applet for auditing purposes, or to ensure that the installed version of the virtual machine is compatible with that required for running the applet. Thus the MIF interpreter would act as a form of preprocessor in the virtual machine, in a similar manner (and immediately prior to) the byte code validator which currently initially verifies byte codes passed to the virtual machine for execution. In this approach the virtual machine preferably contains a hook to allow third party MIF interpreter programs to be bolted on to the virtual machine, although it would also be possible to incorporate that MIF interpreter function into the virtual machine itself.

Additionally, although the preferred embodiment has been described primarily with reference to an otherwise conventional computer workstation attached to the Internet, it will be appreciated that the invention is not so limited. For example, the computer workstation might be replaced by a so-called network computer, or any other hardware which is capable of receiving code over a network, such as a set-top box, a television Internet access device, and so on. Likewise, the relevant network may not be the Internet, but might be a corporate intranet (which typically uses Internet protocols such as html, but which is detached from the Internet itself), or any other suitable network. Further, whilst the code to be downloaded in the preferred embodiment comprises Java byte codes, this code might be in any appropriate language, and might be in a form either to be interpreted, for example by a virtual machine, as with Java, or to be directly executed on the hardware of the client machine. In this case the MIF file could be used to verify that the target operating system of the code to be downloaded matches that installed at the client machine.

What is claimed is:

1. A method of operating a computer system attached to a network, comprising the steps of:

retrieving over said network at least one Web page of data;

parsing said at least one page of data to locate an applet tag which refers to applet code that is available over the network for execution at said computer;

locating, associated with said applet tag an identifier to a file containing information about said code, said information comprising a list of attribute values which describes said code;

retrieving the list of attributes;

making a decision based on the contents of the list of attributes as to whether said code should be retrieved; and retrieving said code if said decision was made to retrieve the code.

2. The method of claim 1, further comprising the step of utilising said information in order to determine whether or not to run said code.

3. The method of claim 1, wherein said identifier is in the form of a Universal Resource Locator (URL).

4. The method of claim 2, further comprising the step of presenting at least part of said information to the user of said computer in order to allow said user to determine whether or not to run said code.

5. The method of claim 2, further comprising the step of comparing at least part of said information against one or more predetermined criteria to determine whether or not to run said code.

6. The method of claim 1 or 2, wherein said at least one page of data is in html format.

7. The method of claim 1 or 2, wherein said computer runs a Web browser to access said at least one page of data, and said reference is in the form of a Universal Resource Locator (URL).

8. The method of claim 1 or 2, wherein the information is stored in a form conforming to the Management Information Format (MIF).

9. The method of claim 1 or 2, wherein the information is stored in a remote database, and said step of retrieving the information comprises remotely interrogating said database over the network.

10. The method of claim 1 or 2, wherein said information includes the size of said code.

11. A computer system, attachable to a network comprising:

means for retrieving over said network at least one page of Web data;

means for parsing said at least one page of data to locate an applet tag which refers to applet code that is available over the network for execution at said computer;

means for locating, associated with said applet tag, an identifier to a file containing information about said code, said information comprising a list of attribute values which describes said code;

means for retrieving the list of attributes;

means for making a decision based on the contents of the list of attributes as to whether said code should be retrieved; and means for retrieving said code if said decision was made to retrieve the code.

12. The system of claim 11, further comprising means for utilising said information in order to determine whether or not to run said code.

13. The system of claim 11, wherein said identifier is in the form of a Universal Resource Locator (URL).

14. The system of claim 12, further comprising means for presenting at least part of said information to the user of said computer in order to allow said user to determine whether or not to run said code.

15. The system of claim 12, further comprising means for comparing at least part of said information against one or more predetermined criteria to determine whether or not to run said code.

16. The system of claim 11 or 12, wherein said at least one page of data is in html format.

17. The system of claim 11 or 12, wherein said computer runs a Web browser to access said at least one page of data, and said reference is in the form of a Universal Resource Locator (URL).

18. The system of claim 11 or 12, wherein the information is stored in a form conforming to the Management Information Format (MIF).

19. The system of claim 11 or 12, wherein the information is stored in a remote database, and said means for retrieving the information comprises means for remotely interrogating said database over the network.

20. The system of claim 11 or 12, wherein said information includes the size of said code.

21. A computer program product for execution by a computer system attached to a network comprising:

means for retrieving over said network at least one Web page of data;

means for parsing said at least one page of data to locate an applet tag which refers to applet code that is available over the network for execution at said computer;

means for locating, associated with said applet tag, an identifier to a file containing information about said code, said information comprising a list of attribute values which describes said code;

means for retrieving the list of attributes;

means for making a decision based on the contents of the list of attributes as to whether said code should be retrieved; and means for retrieving said code if said decision was made to retrieve the code.

22. The computer program product of claim 21, further comprising means for utilising said information in order to determine whether or not to run said code.

23. The computer program product of claim 21, further comprising the means for using said reference to retrieve the code over the network.

24. The computer program product of claim 23, further comprising means for executing the retrieved code at the computer.

25. The computer program product of claim 22, further comprising means for presenting at least part of said information to the user of said computer in order to allow said user to determine whether or not to run said code.

26. The computer program product of claim 22 or 25, further comprising means for comparing at least part of said information against one or more predetermined criteria to determine whether or not to run said code.

27. The computer program product of claim 21, or 24, wherein the information is stored in a file, and said means for retrieving the information about the code comprises means for copying the file onto said computer.

28. The computer program product of claim 27, wherein the information is stored in a form conforming to the Management Information Format (MIF), and said computer program product further includes means for loading the MIF information into the MIF database at the computer.

29. The computer program product of claim 28, further comprising means for interrogating said MIF database to access the loaded MIF information.

30. The computer program product of claim 21 or 24, wherein the information is stored in a remote database, and said means for retrieving the information comprises means for remotely interrogating said database over the network.

31. A method of operating a Web server attached to the Internet comprising the steps of:

receiving a request from a Web browser for a Web page of data located at the Web server;

returning the requested page of data to the Web browser; and including within the requested page an applet tag including (i) a reference to an applet and (ii) an identifier of a file containing information about said applet, said information comprising a list of attribute values which describes said applet, the attribute values being useful by the Web browser in deciding whether the applet should be requested.

* * * * *